United States Patent
Koyama

(10) Patent No.: US 7,382,398 B2
(45) Date of Patent: Jun. 3, 2008

(54) IMAGE PICKUP APPARATUS AND METHOD FOR THE OUTPUT OF AV DATA AND THE CONTROL OF THE OUTPUT OF AV DATA TO AN EXTERNAL STORAGE DEVICE

(75) Inventor: Shinichi Koyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 10/055,902

(22) Filed: Jan. 28, 2002

(65) Prior Publication Data
US 2002/0102095 A1 Aug. 1, 2002

(30) Foreign Application Priority Data
Feb. 1, 2001 (JP) ............... 2001-025951

(51) Int. Cl.
H04N 5/225 (2006.01)
H04N 5/76 (2006.01)

(52) U.S. Cl. ............... 348/207.1; 348/231.9; 348/14.12

(58) Field of Classification Search ............... 348/209, 348/207.1, 231.3, 231.8, 231.9, 231.2, 231.7, 348/211.3; 386/92, 124, 66, 119
See application file for complete search history.

(56) References Cited

U.S. PATENT DOCUMENTS

| | | | | |
|---|---|---|---|---|
| 5,206,739 | A * | 4/1993 | Miyaji | 386/119 |
| 5,448,306 | A | 9/1995 | Koyama | 348/678 |
| 5,701,912 | A * | 12/1997 | Greening et al. | 600/586 |
| 5,774,192 | A | 6/1998 | Koyama | 348/715 |
| 6,144,411 | A * | 11/2000 | Kobayashi et al. | 348/441 |
| 6,184,922 | B1 * | 2/2001 | Saito et al. | 348/65 |

(Continued)

FOREIGN PATENT DOCUMENTS
JP 03-277079 12/1991

(Continued)

OTHER PUBLICATIONS

Thompson, D., IEEE 1394: changing the way we do multimedia ommunications; Multimedia IEEE; Apr.-Jun. 2000; vol. 7, issue 2, pp. 94-100.*

(Continued)

Primary Examiner—Lin Ye
Assistant Examiner—Hung H. Lam
(74) Attorney, Agent, or Firm—Fitzpatrick, Cella, Harper & Scinto

(57) ABSTRACT

An image capture apparatus includes an internal recording unit and a communication unit. The internal recording unit starts recording AV data including image and sound data on a recording medium in response to a record start instruction, and stops recording the AV data on the recording medium in response to a record stop instruction. If the image capture apparatus determines that an external storage device is connected to the communication unit, the image capture apparatus starts outputting the AV data to the external storage device in response to the record start instruction. If the image capture apparatus determines that the internal recording unit becomes unable to record the AV data on the recording medium and the communication unit is outputting the AV data, the image capture apparatus stops outputting the AV data to the external storage device in response to the record stop instruction.

10 Claims, 3 Drawing Sheets

U.S. PATENT DOCUMENTS

| | | | |
|---|---|---|---|
| 6,412,076 B1 | 6/2002 | Honda et al. | 713/323 |
| 6,453,071 B2 * | 9/2002 | Ito et al. | 382/232 |
| 6,832,275 B1 * | 12/2004 | Aizawa | 710/62 |

FOREIGN PATENT DOCUMENTS

| | | |
|---|---|---|
| JP | 07-154729 | 6/1995 |
| JP | 11-308568 | 11/1999 |
| JP | 11308568 A * | 11/1999 |
| JP | 2000-066774 | 3/2000 |

OTHER PUBLICATIONS

Santamaria, R., IEEE-1394: a standard for the next millennium, Digital Avionics Systems Conference, 1999, Proceedings, 18th; Oct. 24-29, 1999; pp. vol. 1.C.2-1 through vol. 1 1.C.2-1.*

Sep. 11, 2007 Japanese Official Action in Japanese Patent Appln. No. 2001-025951 (with partial translation).

* cited by examiner

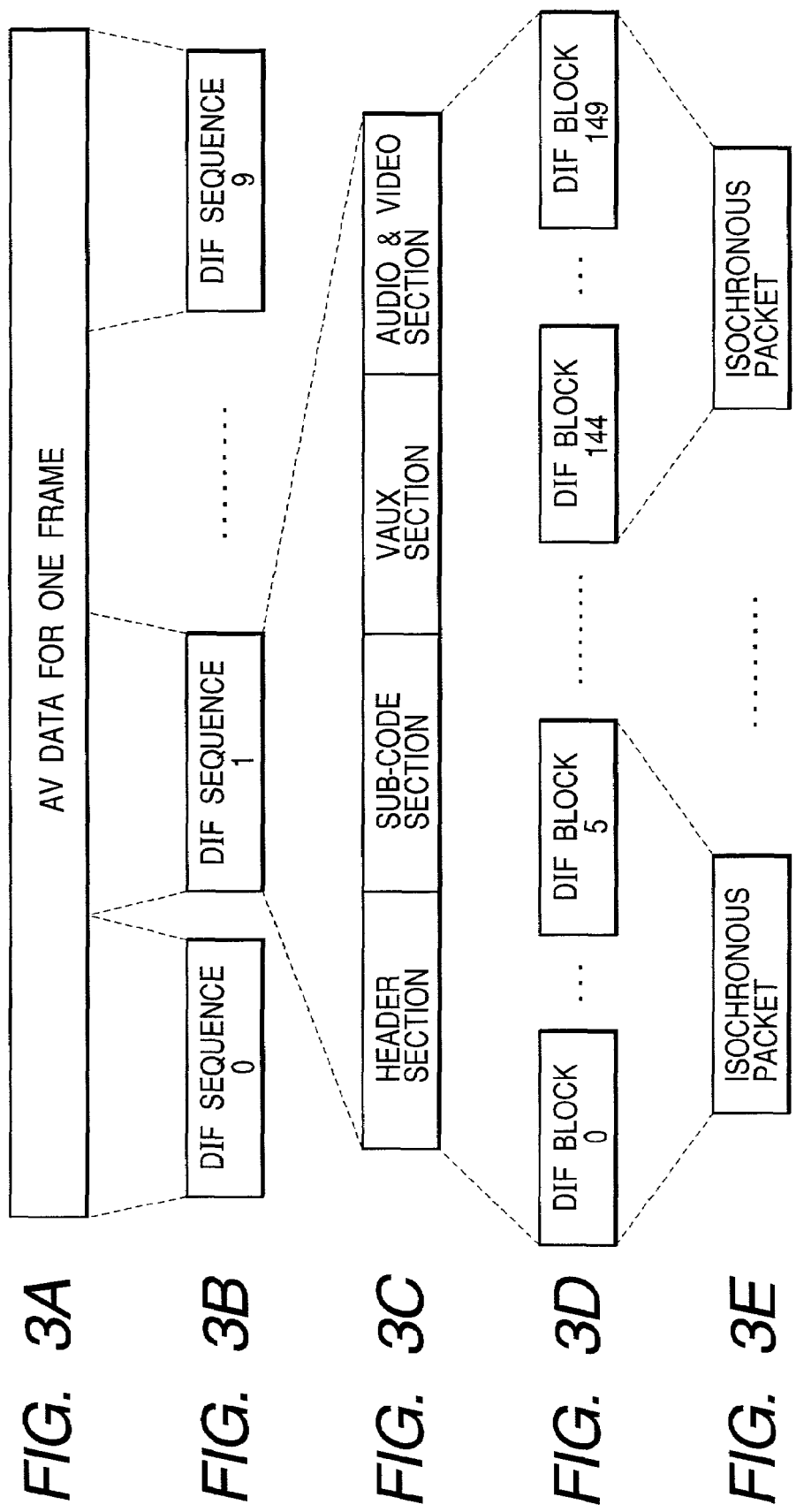

IMAGE PICKUP APPARATUS AND METHOD FOR THE OUTPUT OF AV DATA AND THE CONTROL OF THE OUTPUT OF AV DATA TO AN EXTERNAL STORAGE DEVICE

BACKGROUND OF THE INVENTION

1. Field of the Invention

The present invention relates to an image pickup apparatus for outputting AV (Audio Video) data including image data and sound data to an external, and to its control method.

2. Related Background Art

Camera-integrated digital video recorders have been developed recently which have a digital interface (IEEE1394 interface) in conformity with the IEEE1394-1995 standards.

External storage devices have also been developed recently which can record AV data digitally output from an IEEE1394 interface of a camera-integrated digital video recorder.

If a user desires to record AV data recorded by a camera-integrated digital video recorder in an external storage device, the user interconnects the camera-integrated digital video recorder and external storage device, instructs the camera-integrated digital video recorder to start recording, and at the same time instructs the external storage device to start recording.

With this method, a user is required to instruct both the camera-integrated digital video recorder and external storage device to start recording. This operation is cumbersome and a user load is large.

SUMMARY OF THE INVENTION

The invention has been made in order to solve the above problem. It is an object of the invention to record AV data recorded by an image pickup apparatus in an external storage device without cumbersome operations.

According to a preferred embodiment of the invention, an image pickup apparatus comprises: recording means for recording AV data including image data and sound data; and communication means for starting an output of AV data to be recorded in the recording means in response to an instruction of a record start and for stopping an output of AV data to be recorded in the recording means in response to an instruction of a record stop.

Still other objects of the present invention, and the advantages thereof, will become fully apparent from the following detailed description of the embodiments.

BRIEF DESCRIPTION OF THE DRAWINGS

FIGS. 3A, 3B, 3C, 3D and 3E are diagrams illustrating AV data to be digitally output from the image pickup apparatus of the embodiment.

DETAILED DESCRIPTION OF THE PREFERRED EMBODIMENTS

Preferred embodiments of the invention will be described with reference to the accompanying drawings.

Figure 1:
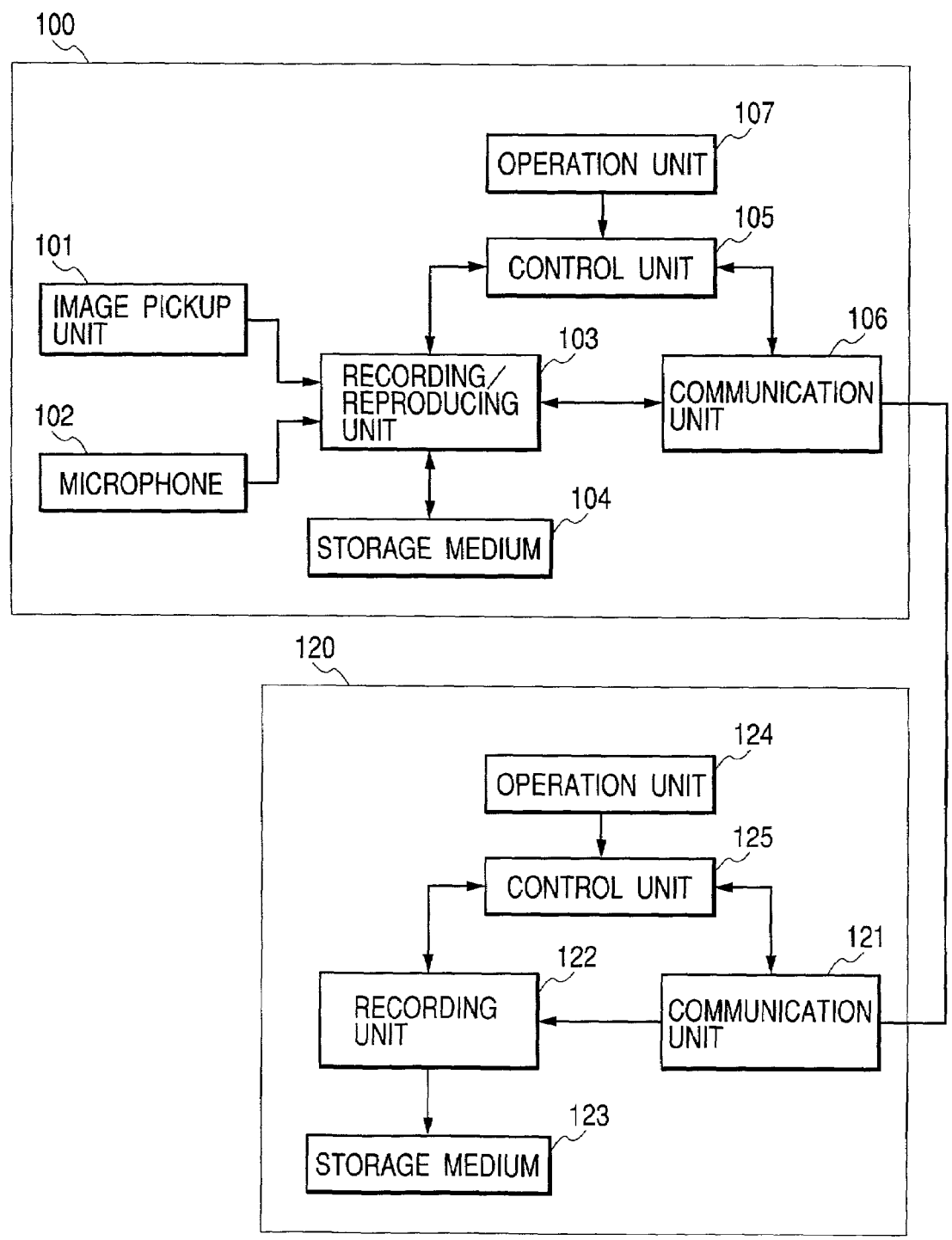
FIG. 1 is a block diagram of a recording system according to an embodiment.

FIG. 1 is a diagram showing a recording system according to an embodiment. Referring to FIG. 1, the recording system has a camera-integrated digital video recorder (hereinafter called an image pickup apparatus) 100 and an external storage device 120 for storing AV data digitally output from the image pickup apparatus 100.

Next, with reference to FIG. 1, the main structure of the image pickup apparatus 100 of the embodiment will be described. Referring to FIG. 1, the image pickup apparatus 100 has an image pickup unit 101, a microphone 102, a recording/reproducing unit 103, a storage medium 104, a control unit 105, a communication unit 106 and an operation unit 107.

The image pickup apparatus 100 has a "camera mode" and a "VTR mode". A user can select either the "camera mode" or the "VTR mode" by operating a mode select key of the operation unit 107.

When the camera mode is selected, the control unit 105 activates the image pickup unit 101 and microphone 102 and makes the recording/reproducing unit 103 enter a record state or a record stop state. During this mode, the user can change the state of the recording/reproducing unit 103 either to the record state or the record stop state by operating a trigger key of the operation unit 107.

When the VTR mode is selected, the control unit 105 stops the image pickup unit 101 and microphone 102 and activates the recording/reproducing unit 103. During this mode, the user can reproduce AV data recorded in the storage medium 104, temporarily stop, fast feed, or rewind by operating the operation unit 107.

During the camera mode, the image pickup unit 101 picks up an optical image of a subject to generate image data. The image data generated by the image pickup unit 101 is supplied to the recording/reproducing unit 103. During the camera mode, the microphone 102 collects external sounds to generate sound data. The sound data generated by the microphone 102 is supplied to the recording/reproducing unit 103.

The recording/reproducing unit 103 generates AV data in conformity with a data format (e.g., the standard definition (SD) data format) defined by a home digital VCR scheme (hereinafter called a DV scheme) by HD Digital VCR Conference. This AV data includes the image data generated by the image pickup unit 101, the sound data generated by the microphone 102 and associated additional data.

The AV data to be recorded in the storage medium 104 by the recording/reproducing unit 103 or the AV data reproduced from the storage medium 104 by the recording/reproducing unit 103 is supplied to the communication unit 106.

The communication unit 106 has a digital interface in conformity with the IEEE1394-1995 standards or extended standards. If the external storage device 120 is connected to the communication unit 106, the communication unit 106 digitally outputs AV data supplied from the recording/reproducing unit 103 in accordance with a predetermined communication protocol (e.g., a communication protocol in conformity with the IEC61883 standards).

With reference to FIGS. 3A to 3E, a procedure to be executed by the image pickup apparatus 100 of the embodiment will be described, which procedure digitally outputs AV data in conformity with the SD format of the 525-60 scheme (NTSC scheme) in accordance with the communication protocol in conformity with the IEC61883standards.

First, the communication unit 106 generates ten DIF sequences from AV data for one frame supplied from the recording/reproducing unit 103, as shown in FIGS. 3A and 3B. As shown in FIG. 3C, each DIF sequence is constituted of a header section, a sub-code section, a VAUX sections, and an audio & video section. Image data and sound data are stored in the audio & video section.

Next, the communication unit 106 generates one hundred and fifty DIF blocks from each DIF sequence, and an isochronous packet from six DIF blocks, as shown in FIGS. 3D and 3E. Each isochronous packet is digitally output at every 125 μs in accordance with the isochronous transfer scheme defined by the IEEE1394-1995.

Next, the main structure of the external storage device 120 of the embodiment will be described with reference to FIG. 1. Referring to FIG. 1, the external storage device 120 has a communication unit 121, a record unit 122, a storage medium 123, an operation unit 124 and a control unit 125.

Similar to the communication unit 106, the communication unit 121 has a digital interface in conformity with the IEEE1394-1995 standards or extended standards. The communication unit 121 digitally inputs AV data digitally output from the communication unit 106 of the image pickup apparatus 100 in accordance with a predetermined communication protocol (e.g. a communication protocol in conformity with the IEC61883 standards). The communication unit 121 receives the isochronous packet shown in FIG. 3E at every 125 μs to generate AV data shown in FIG. 3A and supply it to the recording unit 122.

The recording unit 122 records AV data supplied from the communication unit 121 in the storage medium 123. The data format of AV data to be recorded in the storage medium 123 by the external storage device 120 is the same as the data format of AV data to be recorded in the storage medium 104 by the image pickup apparatus 100. In this embodiment, the storage medium 123 is a randomly accessible storage medium such as a magnetic disc, an optical disc, and a hard disk.

Figure 2:
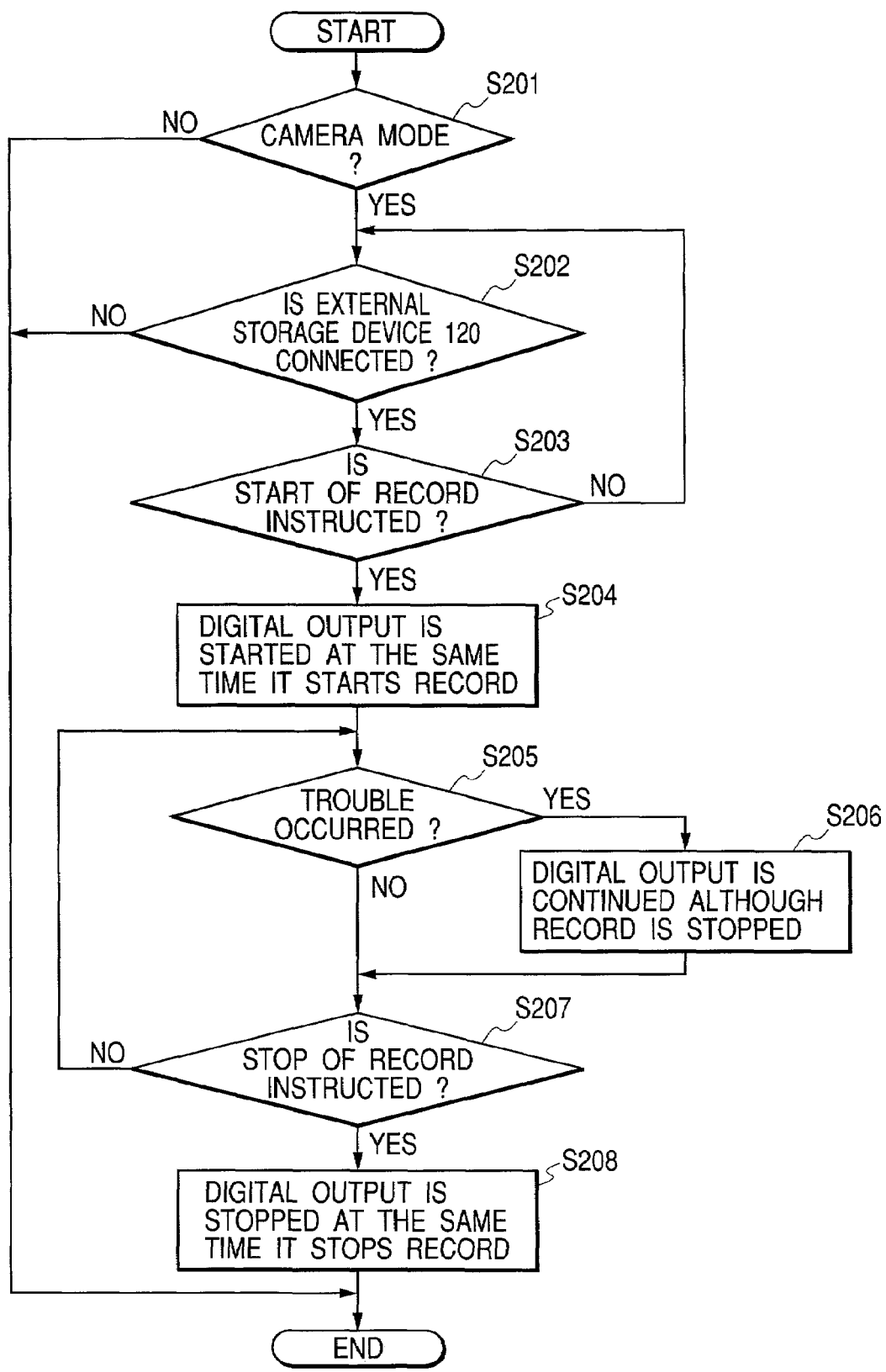
FIG. 2 is a flow chart illustrating the operation to be performed by an image pickup apparatus according to an embodiment.

Next, with reference to FIG. 2, the main procedure to be executed by the image pickup apparatus 100 of the embodiment will be described. A portion of the procedure shown in FIG. 2 is realized by a microcomputer of the control unit 105 which operates in accordance with a control program stored in a storage medium of the control unit 105.

Step S201: The control unit 105 judges whether the current operation mode is the camera mode. If the operation mode is the camera mode, the flow advances to Step S202, whereas if not, the procedure is terminated.

Step S202: The control unit 105 judges whether the external storage device 120 is connected to the communication unit 106. If connected to the external storage device 120, the flow advances to Step S203, whereas if not, the procedure is terminated.

Step S203: The control unit 105 judges whether an instruction of a record start is input. The instruction of the record start is input to the control unit 105 if the trigger key of the operation unit 107 is operated. If this instruction of the record start is input, the flow advances to Step S204.

Step S204: The control unit 105 instructs the recording/reproducing unit 103 to start recording AV data, and at the same time instructs the communication unit 106 to start digitally outputting AV data. The recording/reproducing unit 103 records the AV data in the storage medium 104, and at the same time supplies AV data recorded in the storage medium 104 to the communication unit 106. The communication unit 106 digitally outputs the AV data supplied from the recording/reproducing unit 103 to the external storage device 120.

Step S205: The control unit 105 judges whether the recording/reproducing unit 103 in operation has any trouble. If the recording/reproducing unit 103 cannot record AV data normally (e.g., if the capacity of the storage medium 104 becomes insufficient), the recording/reproducing unit 103 automatically stops the record of AV data and notifies the control unit 105 of the trouble.

Step S206: The control unit 105 makes the recording/reproducing unit 103 stop the record of AV data, although it makes the communication unit 106 continue to digitally output AV data.

Step S207: The control unit 105 judges whether an instruction of a record stop is input. The instruction of the record stop is input to the control unit if the trigger key of the operation unit 107 is operated. If the record stop instruction is input, the flow advances to Step S208.

Step S208: The control unit 105 makes the recording/reproducing unit 103 stop recording AV data, and at the same time makes the communication unit 106 stop digitally outputting AV data.

As described above, according to the recording system of this embodiment, digitally outputting AV data can be started or stopped only by operating the trigger key of the operation unit 107 of the image pickup apparatus 100. Therefore, without any cumbersome operation, AV data recorded by the image pickup apparatus 100 can be recorded also in the external storage device 120. Furthermore, since AV data recorded by the image pickup apparatus 100 can be recorded in the external storage device 120, a dubbing time can be dispensed with and the edit work efficiency can be improved.

According to the recording system of the embodiment, even if the recording/reproducing unit 103 becomes unable to record AV data after the record start instruction is input (e.g., even if the capacity of the storage medium 104 becomes insufficient), it is possible to continue to digitally output AV data until the record stop instruction is input, so that AV data not recorded by the image pickup apparatus 100 can be reliably recorded in the external storage device 120.

The invention may be embodied in other specific forms without departing from essential characteristics thereof.

For example, the data format of AV data of the embodiment is not limited only to the data format in conformity with the DV scheme, but it may be the data format in conformity with a transport stream scheme of MPEG2.

Therefore, the above-described embodiments are merely exemplary of this invention, and are not construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the invention.

What is claimed is:

1. An image capture apparatus comprising:

an image capture unit that captures an image and outputs image data;

a microphone unit that outputs sound data;

an internal recording unit that (a) starts recording the image and sound data on a recording medium in response to a record start instruction, and (b) stops recording the image and sound data on the recording medium in response to a record stop instruction;

a communication unit capable of connecting with an external storage device and outputting the image and sound data;

a control unit that (a) determine determines whether the external storage device is connected to said communication unit, and (b) determines whether said internal recording unit becomes unable to record the image and sound data on the recording medium, wherein if said control unit determines that the external storage device is connected to said communication unit, said control unit starts outputting the image and sound data from said communication unit to the external storage device in response to the record start instruction, and wherein if said control unit determines that said internal recording unit becomes unable to record the image and sound data on the recording medium when said communication unit is outputting the image and sound data, said control unit stops outputting the image and sound data from said communication unit to the external storage device in response to the record stop instruction without sending to the external storage device a command for stopping recording the image and sound data.

2. An image capture apparatus according to claim 1, wherein even if said internal recording unit becomes unable to record the image and sound data on the recording medium, said control unit does not discontinue output of the image and sound data from said communication unit.

3. An image capture apparatus according to claim 1, wherein said communication unit outputs the image and sound data using an isochronous transfer conformed to IEEE 1394-1995 standards.

4. An image capture apparatus according to claim 1, wherein said image capture apparatus is a camera-integrated digital video recorder.

5. An image capture apparatus according to claim 1, wherein the image and sound data is conformed to an MPEG2 transport stream.

6. A method of controlling an image capture apparatus, the image capture apparatus comprising (a) an image capture unit that captures an image and outputs image data, (b) a microphone unit that outputs sound data, (c) an internal recording unit that (i) starts recording the image and sound data on a recording medium in response to a record start instruction, and (ii) stops recording the image and sound data on the recording medium in response to a record stop instruction, and (d) a communication unit capable of connecting with an external storage device and outputting the image and sound data, said method comprising:

a first determining step of determining whether the external storage device is connected to the communication unit;

a second determining step of determining whether the internal recording unit becomes unable to record the image and sound data on the recording medium;

if it is determined in said first determining step that the external storage device is connected to the communication unit, starting outputting the image and sound data from the communication unit to the external storage device in response to the record start instruction; and if it is determined in said second determining step that the internal recording unit becomes unable to record the image and sound data on the recording medium when the communication unit is outputting the image and sound data, stopping outputting the image and sound data from the communication unit to the external storage device in response to the record stop instruction without sending to the external storage device a command for stopping recording the image and sound data.

7. A method according to claim 6, further comprising a step of:

even if the internal recording unit becomes unable to record the image and sound data on the recording medium, not discontinuing output of the image and sound data from the communication unit.

8. A method according to claim 6, wherein the communication unit outputs the image and sound data using an isochronous transfer conformed to IEEE 1394-1995 standards.

9. A method according to claim 6, wherein the image capture apparatus is a camera-integrated digital video recorder.

10. A method according to claim 6, wherein the image and sound data is conformed to an MPEG2 transport stream.

* * * * *

UNITED STATES PATENT AND TRADEMARK OFFICE
CERTIFICATE OF CORRECTION

PATENT NO. : 7,382,398 B2 Page 1 of 1
APPLICATION NO. : 10/055902
DATED : June 3, 2008
INVENTOR(S) : Shinichi Koyama It is certified that error appears in the above-identified patent and that said Letters Patent is hereby corrected as shown below:

ON THE TITLE PAGE, AT ITEM (56), References Cited, OTHER PUBLICATIONS
Line 2, "ommunications" should read --communications--.

COLUMN 2
Line 64, "IEC61883standards" should read --IEC61883 standards--

COLUMN 3
Line 2, "sections" should read --section--.

COLUMN 4
Line 64, "data;" should read --data; and--.

Signed and Sealed this

Ninth Day of December, 2008

JON W. DUDAS
*Director of the United States Patent and Trademark Office*